United States Patent [19]

Gelles et al.

[11] Patent Number: 5,599,879
[45] Date of Patent: Feb. 4, 1997

[54] MODIFIED RADIAL POLYMERS

[75] Inventors: Richard Gelles; Carl L. Willis; John E. Gorman, all of Houston, Tex.; Andres M. Arismendi, Jr., Gaithersburg, Md.

[73] Assignee: Shell Oil Company, Houston, Tex.

[21] Appl. No.: 248,840

[22] Filed: May 25, 1994

Related U.S. Application Data

[62] Division of Ser. No. 34,046, Mar. 22, 1993, abandoned, which is a division of Ser. No. 505,373, Apr. 6, 1990, Pat. No. 5,218,044.

[51] Int. Cl.⁶ .................. C08F 297/04; C08F 287/00; C08L 53/02
[52] U.S. Cl. .................................. 525/285; 525/66
[58] Field of Search .................................. 525/285

[56] References Cited

U.S. PATENT DOCUMENTS

| | | |
|---|---|---|
| 4,077,893 | 3/1978 | Kiovsky ............................ 525/285 |
| 4,141,847 | 2/1979 | Kiovsky . | 
| 4,292,414 | 9/1981 | Saito et al. ........................ 525/255 |
| 4,427,828 | 1/1984 | Hergenrother et al. . |
| 4,508,874 | 4/1985 | Hergenrother et al. ............ 525/285 |
| 4,628,072 | 12/1986 | Shiraki et al. . |
| 4,657,971 | 4/1987 | Shiraki et al. . |
| 4,849,471 | 7/1989 | Saito et al. . |
| 5,073,600 | 12/1991 | Gorman et al. ................... 525/264 |

FOREIGN PATENT DOCUMENTS 61-126164  6/1986  Japan .

*Primary Examiner*—Ana Woodward
*Attorney, Agent, or Firm*—Keith M. Tackett

[57] ABSTRACT

A super-tough polymeric composition comprising an engineering thermoplastic and a modified radial polymer. The engineering thermoplastic is selected from the group consisting of polyamides, thermoplastic polyesters, polyphenylene ether resins, polyarylene sulfide resins, polysulfone and the like. The modified radial polymer is modified by grafting a compound containing a carboxylic acid or carboxylic acid derivative group. The modified, radial polymer has from about 3 to about 50 arms, as determined using light scattering techniques and the arms will be olefin polymers. The polymer compositions will yield shaped articles which fail ductilely when tested using ASTM procedure D-256 at room temperature and some at −20° F.

5 Claims, No Drawings

MODIFIED RADIAL POLYMERS

This is a division of application Ser. No. 08/034,046 filed Mar. 22, 1993, now abandoned, which is a division of application Ser. No. 07/505,373 filed Apr. 6, 1990, now U.S. Pat. No. 5,218,044.

FIELD OF THE INVENTION

This invention relates to a polymer composition. More particularly, this invention relates to a polymer composition comprising an engineering thermoplastic and a functionalized radial polymer.

BACKGROUND OF THE INVENTION

Thermoplastic resins such as the polyamides, the thermoplastic polyesters, the polyphenylene ether resins, the polyarylene sulfide resins, the polysulfones and the like are, of course, well known in the prior art. As is also well known in the prior art, these thermoplastic resins generally exhibit a combination of properties including excellent mechanical properties, good high heat resistance and good durability making them particularly useful for the preparation of molded, cast and extruded mechanical and electrical parts. These resins do not, however, lend themselves to utility in those areas requiring good impact resistance since, generally, they exhibit poor impact resistance.

In light of the several particularly good properties associated with the aforementioned thermoplastic resins, considerable effort has been expended in attempts to improve the impact resistance of the various thermoplastic resins without impairing the other desirable properties thereof. In general, these attempts involve the incorporation of a low modulus rubber into a composition comprising the thermoplastic resin. It is, of course, important that the low modulus rubber not separate from the thermoplastic resin during thermoplastic processing operations. It is, then, important that the low modulus rubber either be compatible with the thermoplastic resin or contain one or more reactive groups which will either chemically or physically bond the low modulus rubber to the thermoplastic resin thereby preventing subsequent separation of the two polymers.

As a practical matter, it is, at best, difficult, if not impossible, to find low modulus rubbers that are compatible with a broad range of thermoplastic resins. As a result, most of the efforts to solve the impact resistance problems of the aforementioned thermoplastic resins has been made with elastomers that are either directly prepared or are modified to contain one or more functional groups that will, in some way, bond with one or more groups contained in the thermoplastic resin used in the composition.

An early attempt to produce thermoplastic resin compositions having improved impact resistance with random type elastomers, which attempt has had some degree of commercial success, at least where a polymer modified with an acid or acid derivative is used as the impact modifier, is taught in U.S. Pat. No. 4,172,859 when a thermoplastic polyester or polycarbonate is the thermoplastic resin and in U.S. Pat. No. 4,174,358 when a polyamide is the thermoplastic resin. As is well known, thermoplastic resin compositions within the scope of the disclosure of these two patents frequently can be classified as "super-tough" at room temperature, but the amount of modifying polymer required sometimes exceeds that allowable for a composition having good tensile modulus and acceptable flexural modulus and yield stress. Moreover, while certain of the compositions can be classified as "super-tough" at room temperature there is little or no improvement in the impact resistance at temperatures below room temperature. As used herein, the recitation "super-tough" means that a sample of the composition failed ductilely, as opposed to brittlely, at the temperature tested using the notched Izod toughness test (ASTM-D256) for ⅛ inch specimen.

In light of these prior art efforts failure to consistently produce super-tough compositions having good tensile modulus and yield stress as well as good low temperature impact properties, the need for an engineering thermoplastic composition having improved impact resistance even at lower temperatures and Mood flexural modulus at all temperatures and a method for preparing such an improved composition is believed to be readily apparent.

SUMMARY OF THE INVENTION

It has now been discovered that the foregoing and other disadvantages of the prior art engineering thermoplastic compositions can be avoided, or at least substantially reduced, with the engineering thermoplastic composition of this invention. It is, therefore, an object of this invention to provide an engineering thermoplastic composition. It is another object of this invention to provide such an engineering thermoplastic composition which will be "super-tough", at least at room temperature, and exhibit good flexural modulus over a relatively broad range of relative engineering thermoplastic and elastomer concentrations and at relatively lower modifier concentrations. It is still another object of this invention to produce such an engineering thermoplastic composition which will exhibit "super-tough" characteristics at least at room temperature and maintain most, if not all, of the properties of the engineering thermoplastic without significant impairment thereof. The foregoing, and other, objects and advantages will become apparent from the description of the invention set forth hereinafter and the examples included therein.

In accordance with the present invention, the foregoing, and other, objects and advantages are accomplished by incorporating a modified radial polymer having a plurality of olefin polymer arms into a composition comprising an engineering thermoplastic polymer, which engineering thermoplastic when used neat exhibits poor impact resistance. The radial polymer is modified by grafting carboxylic acid or carboxylic acid derivative functionality to the olefin polymer arms. The modified radial polymer is incorporated into the polymer composition as an impact modifier. As indicated more fully hereinafter, various parameters of the modified radial polymer pertinent with respect to the production of "super-tough" compositions must be controlled so as to produce compositions which are "super-tough" at least at room temperature. These parameters include the amount of carboxylic acid and/or carboxylic acid derivative functionality incorporated into the radial polymer, the molecular weight of the radial polymer and the amount of the radial polymer incorporated into the engineering thermoplastic composition.

DETAILED DESCRIPTION OF THE INVENTION

As just indicated supra, the present invention relates to a polymeric composition comprising an engineering thermoplastic polymer, which engineering thermoplastic polymer when used neat exhibits poor impact resistance, and a modified radial polymer, which radial polymer is used as an impact modifier for the engineering thermoplastic polymer. The radial polymer comprises a plurality of olefin polymer arms and is modified by grafting carboxylic acid or carboxylic acid derivative functionality onto the olefin polymer arms. As indicated more fully infra, those variables which must be controlled to produce a "super-tough" composition will be controlled so as to produce a super-tough composition. A composition will be super-tough as that recitation is used herein when a ⅛ inch shaped article fashioned therefrom fails in a ductile as opposed to brittle manner when tested at room temperature to determine its ⅛" notched Izod value using ASTM-D256 test procedure. Generally, the notched Izod value associated with ductile failure of the ⅛ inch specimen will be at least about 10 ft lb/in. As indicated more fully infra, the method of failure may vary, and generally does, with the temperature at which the test procedure is used. For that reason, then, an article fashioned from the polymeric composition of this invention shall be considered super-tough if the failure at room temperature is ductile. In this regard, it should be noted that many of the compositions within the scope of this invention will yield articles which fail ductilely at temperatures as low as about −30° C. To avoid confusion, then, compositions failing at temperatures between about −5° C. to about −30° C. and particularly between about −15° C. to about −25° C. will be referred to herein as compositions having surprising low temperature impact properties.

In general, any of the engineering thermoplastic polymers known to exhibit poor impact strength when used neat in molded articles can be used in the polymeric composition of this invention. Suitable engineering thermoplastic polymers, then include, but are not necessarily limited to the polyamides, the thermoplastic polyesters, the polyphenylene ether resins, the polyarylene sulfide resins, the polysulfones and the like.

By polyamide is meant a condensation product which contains recurring aromatic and/or aliphatic amide groups as integral parts of the main polymer chain, such products being known generically as "nylons." The polyamide matrix of the toughened compositions of this invention is well known in the art and embraces those semi-crystalline and amorphous resins having a molecular weight of at least 5000 having a linear or branched structure. These polyamides include α-polyamides and α,ω-polyamides. These polyamides have molecular weights of from about 5,000 to about 50,000. Furthermore, the polyamides are preferably linear with a melting point in excess of 200° C.

By "α-polyamides" is meant those polyamides having only one terminal group which strongly interacts or is reactive with the carboxyl functional groups of the block copolymer utilized in the compositions herein, such as an amine group. Examples of such α-polyamides are those polyamides that may be obtained by polymerizing a monoaminocarboxylic acid or an internal lactam thereof having at least two carbon atoms between the amino and carboxylic acid groups thereof. Suitable polyamides include those described in U.S. Pat. Nos. 2,071,250; 2,071,251; 2,241,322; and 2,312,966.

As examples of the said monoaminocarboxylic acids or lactams thereof there may be mentioned those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, caprolactam, capryllactam, enantholactam, undecanolactam, dodecanolactam and 3- and 4-amino benzoic acids.

Illustrative examples of α-polyamides include:
polypyrrolidone (nylon 4)
polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12)

It is also possible to use in this invention polyamides prepared by the copolymerization of two or more of the above polymers or terpolymerization of the above polymers or their components.

By "α,ω-polyamides" is meant those polyamides having at least two terminal groups, e.g. on each end of a linear polyamide, which strongly interact or are reactive with the carboxyl functional groups of the block copolymer utilized in the compositions herein. Preferably, these terminal groups are amines. Examples of such α,ω-polyamides are those polyamides that may be obtained by polymerizing a diamine which contains at least two carbon atoms between the amino groups thereof and a dicarboxylic acid or ester thereof. Suitable α,ω-polyamides include those described in U.S. Pat. Nos. 2,071,250; 2,071,251; 2,130,523; 2,130,948; and 3,393,210, the disclosures of which are herein incorporated by reference.

Typically, these polyamides are prepared by polymerizing substantially equimolar proportions of the diamine and the dicarboxylic acid. Furthermore, excess diamine may be employed to provide an excess of amine end groups over carboxyl end groups in the polyamide.

The term "substantially equimolecular proportions" (of the diamine and of the dicarboxylic acid) is used to cover both strict equimolecular proportions and the slight departures therefrom which are involved in conventional techniques for stabilizing the viscosity of the resultant polyamides.

Examples of the said diamines are diamines of the general formula $H_2N(CH_2)_nNH_2$ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g. 2,2-dimethylpentamethylenediamine and 2,2,4- and 2,4,4-trimethylhexamethylenediamine are further examples. Other diamines which may be mentioned as examples are aromatic diamines, e.g. p-phenylenediamine, 4,4'-diaminodiphenyl sulphone, 4,4'-diaminodiphenyl ether and 4,4'-diaminodiphenyl sulphone, 4,4'-diaminodiphenyl ether and 4,4'-diaminodiphenylmethane; and cycloaliphatic diamines, for example diaminodicyclohexylmethane.

The said dicarboxylic acids may be aromatic, for example isophthalic and terephthalic acids. Preferred dicarboxylic acids are of the formula HOOC—Y—COOH wherein Y represents a divalent aliphatic radical containing at least 2 carbon atoms, and examples of such acids are sebacic acid, octadecanedioic acid, suberic acid, azelaic acid, undecanedioic acid, glutaric acid, pimelic acid, and especially adipic acid. Oxalic acid is also a preferred acid. Furthermore, the dicarboxylic acid may be used in the form of a functional derivative thereof, for example an ester.

Illustrative examples of α,ω-polyamides include:
polyhexamethylene adipamide (nylon 6,6)
polyhexamethylene azelaiamide (nylon 6,9)
polyhexamethylene sebacamide (nylon 6,10)

polyhexamethylene isophthalamide (nylon 6,iP)

polyamide of hexamethylenediamine and n-dodecanedioic acid (nylon 6,12)

polyamide of dodecamethylenediamine and n-dodecanedioic acid (nylon 12,12).

Other α,ω-polyamides may be prepared by the copolymerization of two or more of the above polymers or terpolymerization of the above polymers or their components.

Another α,ω-polyamide is the nylon produced by Dynamit Nobel, which is the product of the dimethyl ester of terephthalic acid and a mixture of isomeric trimethyl hexamethylenediamine.

Thermoplastic polyesters that may be modified in the present invention include polymers having recurring ester linkages as an integral part of the main polymer chain. Thermoplastic polyesters which may be used in the compositions of this invention include, but are not necessarily limited to, those having a weight average molecular weight of at least about 5,000 and glass transition temperatures of at least about 25° C. Useful polyesters, then, include, but are not necessarily limited to, those described in U.S. Pat. No. 4,172,859, the disclosure of which is incorporated herein by reference. Thermoplastic polyesters which may be used in the compositions of this invention may be linear or branched and may be crystalline or amorphous. Useful polyesters include those prepared by condensing a polycarboxylic acid, particularly a dicarboxylic acid, or a derivative thereof and a polyalcohol, particularly a dialcobol. The polycarboxylic acid or derivative thereof used to prepare the polyester may be aromatic or aliphatic. Particularly useful polyesters include the poly(alkylene aryllates) particularly the poly(alkylene terephthalates), the polylactones and the thermoplastic cellulosic esters and the like.

Polyphenylene ethers which may be modified so as to produce a composition within the scope of the present invention include condensation polymers which may be substituted in the two and six positions and graft copolymers of such polyphenylene ethers, wherein the grafting is accomplished with styrene and substituted styrene-type monomers. The substitution on the two and six carbon atoms of the phenyl group may be aliphatic, generally having from one to about four carbon atoms or halogen. If desired, other graftable monomers may be combined with the styrene type monomer when a graft copolymer is used.

Polyarylene sulfide polymers which may be included in the compositions of this invention include homopolymers and copolymers having a structural unit represented by the following general formula:

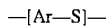

wherein Ar stands for a phenylene group or an alkyl substituted phenylene group. When the phenylene group is alkyl substituted, the alkyl group will, generally, contain from one to about 10 carbon atoms.

Thermoplastic polysulfones which may be used in the compositions of this invention include polymers having repeating phenylene groups bonded to $SO_2$. The phenylene groups contained in the polymer may, occasionally, be bonded to each other through an oxygen atom but repeating $SO_2$ groups are essential. In general, the thermoplastic polysulfones will have a weight average molecular weight of at least 5,000.

The hydrogenated radial polymers useful as modifiers in the compositions of the present invention will comprise a plurality, at least three, and generally 3 to about 50 olefin polymer arms, preferably diolefin polymer arms, as determined using light scattering techniques. The olefin polymer arms may be homopolymers or copolymers and an olefin, particularly a conjugated diolefin having from four to about twelve carbon atoms, will preferably be used. Any of the nuclei known in the prior art to be useful in the production of radial polymers may be used in preparing the radial polymers useful in the compositions of this invention. Suitable nuclei, then, include those which are nonpolymerizable and which contain a fixed number of reactive sites such as those taught in copending U.S. patent application Ser. No. 45,686 as well as those which are polymerizable such as the poly-alkenyl coupling agents taught in U.S. Pat. No. 3,985,830; Canadian Patent No. 716,645 and British Patent No. 1,025,295, the disclosure of which application and patents are incorporated herein by reference. Radial polymers useful as modifiers in the compositions of this invention may be prepared by first forming a living olefin polymer and then reacting the living olefin polymer with a suitable coupling agent and thereafter, if ethylenic unsaturation remains, hydrogenating the resulting radial polymer. Useful radial polymers may, then, be prepared using the techniques summarized in U.S. Pat. Nos. 4,116,917 and 4,156,673, the disclosure of which patents are herein incorporated by reference. When monolefin polymers are used as the arms, certain cation catalysts known in the prior art to be useful in preparing block copolymers will be used and the arms connected to the coupling agent in the same manner as is used to couple polymers prepared with anionic catalyst. When the radial polymer nucleus is formed with a compound having a fixed number of reactive sites, the average number of arms in the polymer will, generally, be controlled by the number of reactive sites in the nucleus. When the nucleus is, however, polymerizable and therefore contains a variable number of reactive sites, the average number of arms in the radial polymer will, generally, be controlled by the relative amount of living polymer and nucleating agent actually combined. In general, the conjugated diolefin polymer arms used in the radial polymer incorporated into the compositions of this invention will have a weight average molecular weight within the range from about 2,000 to about 100,000 and when conjugated diolefin polymer are used as arms in the radial polymer these will be hydrogenated so as to convert or saturate at least about 80 percent of the initial ethylenic unsaturation contained in the polymer. Preferably, the hydrogenation will be accomplished with the reaction product of an aluminum alkyl and a nickel carboxylate in a manner as taught in U.S. Pat. No. 3,700,633.

Polymers of the type which may be modified and then used as an impact modifier in the compositions of the present invention are, of course, available commercially and, when desired, these commercially available polymers may be modified and used. To the extent that polymers with properties different from those of the commercially available materials are desired, however, preparation of the desired radial polymer will be necessary. In any case, after the radial polymer is in hand, it will be necessary to modify the same with a carboxylic acid or a carboxylic acid derivative before using the same as an impact modifier in the compositions of the present invention.

In general, any carboxylic acid or derivative thereof having the ability to react with the radial polymer in free radical initiated reactions are useful to effect the modification needed for the compositions of the present invention. Useful modifying compounds may range from polymerizable to nonpolymerizable compounds and are preferably nonpolymerizable or at least slowly polymerizable. Modification of the radial polymer may be accomplished in solution or in the melt via a free radical mechanism.

While as just indicated supra, any carboxylic acid or acid derivative which may be grafted or otherwise reacted with the radial polymer may be used, the compound actually used will preferably contain slowly polymerizable ethylenic unsaturation. When the compound actually used, then, is nonpolymerizable or slowly polymerizable, the grafting reaction will favor the introduction of a single unit at each site of introduction. Also, preparation of a homopolymer of the compound used for the grafting which could ultimately separate from the other components in the polymer composition will be avoided.

In general, essentially any carboxylic acid or carboxylic acid derivative could, initially, be incorporated into the radial polymer, even those containing groups which groups do not, per se, facilitate performance of the modified, hydrogenated radial polymer as an impact modifier so long as these groups can, ultimately, conveniently be converted to a functional group which will facilitate performance of the modified polymer as an impact modifier. As a practical matter, however, groups that are particularly effective include the acid, per se, salts, anhydrides, esters, imides and amides. It is, of course, important that the functional group actually incorporated into the modified radial polymer chemically react or at least physically bond to a functional group contained in the engineering thermoplastic incorporated into the polymer composition. In general, the compound containing the functional group grafted to the hydrogenated radial polymer will be grafted in an amount within the range from about 0.1 to about 10, preferably from about 0.3 to about 5, and most preferably from about 0.5 to about 3, weight percent based on hydrogenated radial polymer. It will, of course, be appreciated that radial polymers containing a functional group, particularly a cyclic anhydride, within the preferred and most preferred ranges, when incorporated into the composition at its most effective concentration will result in compositions having surprising low temperature impact properties.

Useful compounds which may be grafted to the hydrogenated radial polymer include ethylenically unsaturated mono- and polycarboxylic acids and derivatives thereof, particularly dicarboxylic acids, containing from about three to about ten carbon atoms and preferably a single ethylenic unsaturation. Suitable derivatives include the corresponding anhydrides, salts, esters, ethers, amides, nitriles, thiols, thioacids, glycidyls, cyanides and the like. Examples of compounds which may be grafted to the radial polymer include acrylic acid, methacrylic acid, citraconic acid, maleic acid, fumaric acid, iraconic acid, corresponding anhydrides of these acids, esters of these acids wherein the alcohol moiety contains one to about 10 carbon atoms, glycidyl acrylate and methacrylate, cyanoacrylates, hydroxy substituted alkyl acrylates and methacrylates wherein said alkyl groups contain from one to about 10 carbon atoms, and the like.

The modified radial polymer may be prepared using any of the techniques known in the prior art for preparing such polymers. For example, the modified radial polymer may be prepared using solution processes such as those taught in U.S. Pat. Nos. 4,033,888; 4,077,893; and 4,670,173, the disclosure of which patents are incorporated herein by reference, or with melt-mixing processes such as those taught in U.S. Pat. Nos. 4,427,828; 4,578,429; 4,628,072 and 4,657,971, the disclosure of which patents are incorporated herein by reference.

After the functionalization has been completed, it is advantageous to remove any excess, unreacted functionalizing agent since these materials could compete with functionalizing groups incorporated into the polymer for reaction with reactive groups in the engineering thermoplastic polymers. This could, in turn, reduce the number of reactive sites available for reaction with the modified hydrogenated radial polymer thereby reducing the effectiveness of the modified polymer as an impact modifier.

The thermoplastic resin compositions of this invention may be prepared using any of the techniques or equipment known in the prior art for this purpose. The engineering thermoplastic or thermoplastics, in the case where more than one engineering thermoplastic is used, may be blended with the modified hydrogenated radial polymer or polymers, in the case where more than one radial polymer is used, then, with equipment such as single and multiple screw extruders, mixing rollers, brabender mixers, banbury mills, kneaders and the like. When equipment of this type is used, the blending will be accomplished with the polymeric components in the molten phase and at temperatures sufficiently high to maintain this condition. Alternatively, the polymeric components may be blended by forming a solution of the polymeric components in a suitable solvent and then precipitating the polymer blend or evaporating the solvent. The polymeric blends of this invention may also be formed, simply, by dry mixing of the two or more components.

In general, the thermoplastic resin compositions of this invention will comprise from about 1 to about 50 parts (by weight) of one or more modified hydrogenated radial polymers per 100 parts (by weight) engineering thermoplastic. As indicated supra, the thermoplastic resin compositions of this invention will, broadly, produce molded articles which fail ductilely when ⅛ inch specimen thereof are subjected to testing in accordance with ASTM D 256 at room temperature while compositions within the scope of the preferred embodiments will produce molded articles which will fail ductilely when tested in accordance with ASTM procedure D 256 at or about temperatures as low as −30° C. The compositions of this invention will, then, be super-tough with respect to room temperature testing and compositions within the scope of the preferred embodiment will exhibit surprising low temperature impact properties.

As indicated supra, the critical parameters with respect to the impact resistance of molded articles prepared with any given engineering thermoplastic or combination thereof for the compositions of this invention are: the particular functionalizing agent or agents selected for use in the modified radial polymer; the amount of functionalizing agent incorporated therein; and the amount of modified radial polymer incorporated into the thermoplastic resin composition and the molecular weight of the modified radial polymer or polymers. The value of each of these parameters required for a super-tough molded composition or a molded composition having surprising low temperature impact properties will also vary with the particular thermoplastic resin or resins used in the composition. The extent of reaction or interaction between the functional groups of the modified radial polymer and the thermoplastic resin or resins contained in the composition as well as the particle size of the modified, hydrogenated radial polymer dispersed phase in the composition may also affect the impact properties of articles molded from a given composition but the affect of these variables is certainly not clear at this time.

The thermoplastic resin compositions of this invention may also contain other additives commonly used in such compositions. For example, the compositions of this invention may contain fillers, reinforcing agents, thickeners and the like. When such agents are used, of course, they will be used at concentrations well known in the prior art.

The compositions of the present invention may be molded or otherwise formed into various types of shaped articles using conventional techniques well known in the prior art. The shaped articles will exhibit improved impact resistance when compared to the same composition but without the impact modifier. Additionally, when the forementioned agents are added to the compositions of the present invention, the amounts of agents added reduce the impact resistance of shaped articles formed therefrom such that the article is no longer supertough. However, these shaped articles will still exhibit improved impact resistance when compared to the same composition, but without the impact modifier, i.e., the modified radial polymer.

PREFERRED EMBODIMENT

In a preferred embodiment of the present invention, a modified, hydrogenated radial polymer having from about 15 to about 25 arms, as determined using light scattering GPC techniques, isoprene scale, will be used to modify an engineering thermoplastic selected from the group consisting of polyamides and thermoplastic polyesters. The modified, hydrogenated radial polymer will be modified by grafting a compound thereto containing a functional group selected from the group consisting of the carboxylic acid anhydrides, preferably cyclic anhydrides, having from about 3 to about 10 carbon atoms and mixtures thereof, most preferably maleic anhydride. In the more preferred embodiment, the modified, hydrogenated radial polymer will be used as an impact modifier in a thermoplastic resin composition comprising a polyamide and in a most preferred embodiment the modified, hydrogenated radial polymer will be used as an impact modifier in a thermoplastic resin composition comprising an $\alpha,\omega$-polyamide. In the preferred embodiment, the modified, hydrogenated radial polymer will comprise from about 0.3 to about 5 weight percent of modifying compound, based on total polymer and each arm in the modified, hydrogenated radial polymer will have a weight average molecular weight within the range from about 30,000 to about 100,000. In the more preferred and most preferred embodiments, the modified radial polymer will contain from about 0.5 to about 3.0 weight percent functional groups, based on total polymer and each arm of the radial polymer will have a weight average molecular weight within the range from about 30,000 to about 75,000. In the preferred embodiment, a conjugated diolefin having from 4 to about 10 carbon atoms will be used to prepare the modified, hydrogenated radial polymer. In a more preferred embodiment, the conjugated diolefin will be selected from the group consisting of butadiene, isoprene and mixtures thereof and in a most preferred embodiment the arms will be homopolymers and in the most preferred embodiments the arms of the modified, hydrogenated radial polymer will be homopolymers of isoprene. In the preferred, more preferred and most preferred embodiments, the initially unsaturated polymer will be hydrogenated so as to saturate at least 95% of the initial ethylenic unsaturation. In the preferred embodiment, the modified radial polymer will be contained in the composition in an amount ranging from about 8 to about 35 parts (by weight) per 100 parts (by weight) engineering thermoplastic. In a most preferred embodiment of this invention, the modified radial polymer will be contained in the composition in an amount ranging from about 10 to about 25 parts (by weight) per 100 parts (by .weight) engineering thermoplastic.

Having thus described the present invention, a preferred, more preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, an engineering thermoplastic resin composition was prepared using a commercially available poly(butylene terephthalate) and a modified, hydrogenated radial polymer having, on average, 15 hydrogenated polyisoprene homopolymer arms as determined using light scattering techniques. The poly(butylene terephthalate) used was Valox 310, which is available from General Electric. The modified, hydrogenated radial polymer was prepared by first forming a living polyisoprene homopolymer by polymerizing isoprene with an n-butyl lithium catalyst to a weight average molecular weight of about 64,000 and then reacting this living isoprene polymer with divinyl benzene. The radial polymer was then hydrogenated in the presence of a catalyst prepared by combining nickel 2-ethyl hexanoate and triethyl aluminum. The nickel 2-ethyl hexanoate and triethyl aluminum were combined in a mole ratio of about 3:1 Ni:Al and the nickel 2-ethyl hexanoate contained 0.5 moles water per mole of nickel 2-ethyl hexanoate. The hydrogenation was completed at a time, temperature, hydrogen partial pressure and catalyst concentration to enable hydrogenation of at least 98% of the ethylenic unsaturation initially contained in the radial polymer. A portion of this polymer was then grafted with 1.2 weight percent maleic anhydride by passing the polymer, maleic anhydride and a peroxide through a twin screw extruder at a temperature of about 260° C. Unreacted maleic anhydride was removed by pulling a vacuum on the molten modified polymer during the extruder grafting process. After the maleated, hydrogenated radial polymer was prepared, a polyester resin composition (hereinafter referred to as Comp. No. 3) was prepared by combining the poly(butylene terephthalate) and the maleated, hydrogenated radial polymer in a ratio of 70 parts (wt) polyester per 30 parts (wt) of maleated, hydrogenated radial polymer. The polymers were blended in the melt phase in a twin screw extruder. After the polymer composition (Comp. No. 3) was prepared, a portion thereof was molded into ⅛ inch thick specimen suitable for testing using ASTM procedure D-256 to determine notched Izod values. Due to variations in the molded structure, notched Izod values were determined at both the dead end and gate end of the mold. For purposes of comparison, a polymeric composition (hereinafter referred to as Comp. No. 2) was prepared using a portion of the same poly(butylene terephthalate) and the unmaleated hydrogenated radial polymer in the same ratios. A portion of this sample was also molded into ⅛ inch thick specimen suitable for testing in the same ASTM procedure and the notched Izod values of the molded structure again determined. For purposes of further comparison, the poly(butylene terephthalate) alone (hereinafter Comp. No. 1) was molded into a ⅛ inch thick structure and the notched Izod values determined for this specimen using ASTM D 256 as well. The notched Izod values were determined at both room temperature and −20° F. The flexural modulus in Mpsi was also determined for each of the specimen. The results actually achieved are set forth in the following Table:

| Comp. No. | ⅛" Notched Izod (ft lb/in) RT | −20° F. | Flex Mod (Mpsi) |
|---|---|---|---|
| 1 | 0.9 | 0.8 | 342 |
| 2 | 5.2/3.9 | 1.7/1.5 | 176 |
| 3 | 16.3/15.4 | 3.2/3.2 | 174 |

As will be apparent from the data summarized in the preceding table, the composition comprising a commercially available poly(butylene terephthalate) and a maleated, hydrogenated radial polymer produced a molded structure which would be considered super-tough having ⅛" notched Izod values at room temperature above about 10 ft lbs/in. The composition did not, however, exhibit surprising low temperature impact properties due primaryly to the low amount of maleic anhydride in the radial polymer and the fact that the engineering thermoplastic was a polyester.

EXAMPLE 2

In this example, an engineering thermoplastic resin composition within the scope of the present invention was prepared with a commercially available nylon 6,6 and a maleated, hydrogenated radial polymer identical to that used in Example 1. The nylon 6,6 actually used was Zytel 101 available from E. I. Dupont de NeMoures & Co. In the composition prepared in this example, the engineering thermoplastic resin composition within the scope of this invention contained 80 weight percent of the nylon 6,6 and 20 weight percent of the maleated, hydrogenated radial polymer. After the composition was prepared, a portion thereof was molded into ⅛ inch thick specimens and the notched Izod values determined at room temperature and −20° F. in the same manner as was used in Example 1 except the samples were kept dry as molded. The flexural modulus was also determined in the same manner as was used in Example 1 except the samples were kept dry as molded. For purposes of comparison, these same values were determined for a polymeric composition prepared in the same manner as that within the scope of the present invention except that the unmaleated radial polymer was substituted for the maleated radial polymer at the same concentration. Also for purposes of comparison, the ⅛" notched Izod value and flexural modulus of molded articles prepared with just the nylon 6,6 were determined. For purposes of convenience, the polymeric composition within the scope of this invention is hereinafter referred to as composition no. 6, the composition prepared with the unmaleated, hydrogenated, radial polymer is identified as composition no. 5 and the composition prepared solely with the nylon 6,6 is identified as composition no. 4. The results obtained with each composition are summarized in the following Table:

| Comp. No. | ⅛" Notched Izod (ft lb/in) RT | −20° F. | Flex Mod (Mpsi) |
|---|---|---|---|
| 4 | 0.8 | 0.7 | 440 |
| 5 | 0.9/0.9 | 0.6/0.6 | 285 |
| 6 | 18.6/18.4 | — | 248 |

As will be apparent from the data summarized in the preceding Table, a super-tough composition was obtained with as little as 20 weight percent of the maleated, hydrogenated radial polymer. Also, while the flexural modulus of the compositions containing the modified, hydrogenated radial polymer are less than those of the nylon 6,6 alone the flexural modulus actually obtained are adequate for most end use applications.

EXAMPLE 3

In this example, five engineering thermoplastic resin compositions were prepared at five different concentrations of a maleated, hydrogenated radial polymer. The engineering thermoplastic used in each of the compositions was a nylon 6,6 identical to that used in Example 2. The maleated, hydrogenated radial polymer used in each of the compositions also was identical to that used in Example 2. The compositions were prepared in a manner identical to that used in Example 2 and, after each composition was completed, the ⅛" notched Izod values at room temperature and −20° F were determined in the same manner as was used in Example 2 and the flexural modulus (Flex Mod) of each composition was determined in Mpsi. The five compositions prepared contained the maleated, hydrogenated radial polymer at concentrations of 5, 10, 15, 20 and 25 weight percent with the remainder being nylon 6,6 and for convenience, these compositions are referred to hereinafter as Comp. Nos. 7–11, respectively. The results obtained with each composition are summarized in the following Table:

| Comp. No. | Modifier Wt % | ⅛" Notched Izod (ft-lb/in) RT | −20° F. | Flex Mod (Mpsi) |
|---|---|---|---|---|
| 7 | 5 | 2.2/2.2 | 1.4/1.4 | 335 |
| 8 | 10 | 3.5/12.2 | 2.3/2.5 | 291 |
| 9 | 15 | 16.0/16.8 | 3.7/4.3 | 265 |
| 10 | 20 | 19.2/19.2 | 14.8/16.4 | 235 |
| 11 | 25 | 19.7/19.3 | 19.0/19.6 | 194 |

As will be apparent from the data summarized in the preceding Table, compositions comprising a maleated, hydrogenated radial polymer surprisingly are super-tough at modifier concentrations as low as 10 weight percent and exhibit surprising low temperature impact properties at concentrations as low as 20 weight percent. Also, the flexural moduli, while lower than that of the nylon 6,6 alone are adequate for most end use applications.

EXAMPLE 4

In this example, a series of engineering thermoplastic resin compositions were prepared at five different modified, hydrogenated radial polymer concentrations. The engineering thermoplastic resin used in each of the compositions was a nylon 6,6 identical to that used in Examples 2 and 3 while the modified, hydrogenated radial polymer contained, on average, 17 arms, as determined by light scattering, of polyisoprene homopolymer having a weight average molecular weight of about 35,000. The isoprene polymer was prepared in a manner identical to that used in Example 1 except that polymerization of the isoprene was discontinued when the weight average molecular weight reached 35,000 and the living isoprene homopolymers were then combined with divinyl benzene in the coupling step. The polymer was maleated in the same manner as was used in Example 1 except that the amount of maleic anhydride used was increased such that the polymer ultimately contained 1.8 weight percent maleic anhydride. Again, the compositions prepared in this example contained 5, 10, 15, 20 and 25 weight percent of the maleated, hydrogenated radial polymer and correspondingly 95, 90, 85, 80 and 75 weight percent of the nylon 6,6. For convenience, these compositions are identified hereinafter as Comp. Nos. 12–16, respectively. After each composition was prepared, a portion thereof was molded into ⅛" thick specimens and the notched Izod values at room temperature and at −20° F. determined in the same manner as was used in the previous examples. Similarly, the flexural modulus was also determined in Mpsi. Prior to incorporation into the polymeric composition, the maleated, hydrogenated radial polymer was dried to a moisture content of 0.1 wt % in a vacuum at a temperature of 60° C. The results obtained in each of the examples is summarized in the following Table:

| Comp. No. | Modifier Wt % | ⅛" Notched Izod (ft-lb/in) | | Flex Mod (Mpsi) |
|---|---|---|---|---|
| | | RT | −20° F. | |
| 12 | 5 | 2.0/2.4 | 1.2/1.4 | 356 |
| 13 | 10 | 2.6/3.1 | 2.0/2.5 | 289 |
| 14 | 15 | 11.3/12.5 | 3.0/3.4 | 270 |
| 15 | 20 | 18.0/17.4 | 4.0/4.5 | 200 |
| 16 | 25 | 21.3/19.8 | 9.4/13.0 | 183 |

As will be apparent from the data summarized in the preceding table, compositions comprising nylon 6,6 and the significantly lower molecular weight maleated, hydrogenated radial polymer again exhibited super-tough properties at concentrations of maleated, hydrogenated radial polymer of 15 weight percent and more. Also, the low temperature properties were particularly good for that composition containing 25 weight percent of the radial polymer. This is, of course, somewhat different than the low temperature properties of the compositions containing the higher molecular weight radial polymer and this difference is attributed solely to the difference in molecular weight. As also is apparent from the data summarized in the preceding table, the flexural modulus of the several compositions is lower than that of the nylon 6,6 alone, but all are adequate for most end uses of the compositions.

EXAMPLE 5

In this example, three engineering thermoplastic compositions were prepared at different modified, hydrogenated radial polymer concentrations. The engineering thermoplastic used in these compositions was a nylon 6,6 identical to that used in Example 4 and the modified, hydrogenated radial polymer was a maleated polymer having isoprene homopolymer arms identical to that used in Example 4 except that the modified polymer used in this example was dried to a moisture content of <0.1%w in a fluidized bed using nitrogen at 60° C. After the compositions were completed, a portion of each was molded into ⅛" thick specimens and the notched Izod value determined at room temperature and −20° F. in the same manner as was used in the previous examples. Also, the flexural modulus of each was determined in Mpsi. The compositions contained 15, 20 and 25 weight percent of the modified radial polymer and correspondingly 85, 80 and 75 weight percent of the nylon 6,6. For convenience, these compositions are identified hereinafter as Comp. Nos. 17–19. The results obtained with each composition are summarized in the following Table:

| Comp. No. | Modifier Wt % | ⅛" Notched Izod (ft-lb/in) | | Flex Mod (Mpsi) |
|---|---|---|---|---|
| | | RT | −20° F. | |
| 17 | 15 | 13.5/14.4 | 3.1/3.6 | 264 |
| 18 | 20 | 19.5/20.0 | 5.4/8.5 | 220 |
| 19 | 25 | 20.9/20.0 | 15.2/16.9 | 192 |

As will be apparent from the data summarized in the preceding table, the compositions prepared in this example all resulted in super-tough shaped articles. Also, the low temperature properties of the composition containing 25 weight percent modified, radial polymer were surprisingly good and, in fact, were significantly better than the low temperature properties of the composition of example 4 containing 25 weight percent of the modified, radial polymer. This, then, suggests that the method used to dry the modified, radial polymer could affect at least the low temperature impact properties.

While the present invention has been described and illustrated by reference to particular embodiments thereof, it will be appreciated by those of ordinary skill in the art that the same lends itself to variations not necessarily discussed or illustrated herein. For this reason, reference should be made solely to the appended claims for purposes of determining the true scope of the present invention.

Having thus described and illustrated the invention, What is claimed is:

1. A process for making a modified radial polymer comprising the steps of feeding to an extruder maleic anhydride and a radial polymer comprising at least 10 arms per molecule as determined by light scattering techniques, wherein the arms consist of hydrogenated conjugated diene units, and free radically grafting the maleic anhydride to the radial polymer in the extruder.

2. The process of claim 1 wherein said arms are hydrogenated conjugated diolefin polymers having weight average molecular weights within the range from about 2,000 to about 100,000.

3. The process of claim 1 wherein said arms are isoprene homopolymer arms.

4. The process of claim 2 wherein said molecular weight of the arms is within the range from about 30,000 to about 75,000.

5. The process of claim 1 wherein the hydrogenated radial polymer contains from about 10 to about 25 arms.

\* \* \* \* \*